(12) United States Patent
Trzaskos et al.

(10) Patent No.: US 9,138,814 B2
(45) Date of Patent: Sep. 22, 2015

(54) METHOD FOR MACHINING AND RELATED MACHINING TOOL, MACHINING APPARATUS, AND COMPUTER CODE

(75) Inventors: Piotr S. Trzaskos, Saratoga, CA (US); Donald Q. Ross, III, San Jose, CA (US); William S. Masek, Pleasanton, CA (US); Brian K. Copeland, San Jose, CA (US); John P. Ternus, Los Altos Hills, CA (US); Erik D. Gillow, Santa Clara, CA (US); Napthaneal Y. Tan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 13/542,620

(22) Filed: Jul. 5, 2012

(65) Prior Publication Data

US 2014/0010609 A1 Jan. 9, 2014

(51) Int. Cl.
*B23C 3/12* (2006.01)
*B23C 5/12* (2006.01)
*B23C 5/14* (2006.01)

(52) U.S. Cl.
CPC ... *B23C 5/14* (2013.01); *B23C 3/12* (2013.01); *Y10T 407/19* (2015.01); *Y10T 409/300896* (2015.01); *Y10T 409/303808* (2015.01); *Y10T 409/304144* (2015.01)

(58) Field of Classification Search
CPC .......... B23C 3/12; B23C 3/122; B23C 3/126; B23C 3/128; B23C 5/12; B23C 5/14; B23C 2210/247; B23C 2220/00; B23C 2215/00; B23C 2220/16; B23C 2220/20; Y10T 409/306664; Y10T 409/306776; Y10T 409/307056; Y10T 409/307784; Y10T 409/304144; Y10T 409/303752; Y10T 409/303808; Y10T 407/1946; Y10T 407/195; Y10T 407/952; Y10T 407/1952; Y10T 407/1962

USPC .......... 409/131–132, 138; 407/53, 56, 60, 61; 700/160, 190, 159

See application file for complete search history.

(56) References Cited

U.S. PATENT DOCUMENTS 1,630,173 A * 5/1927 Dumont ..................... 144/134.1
2,632,233 A 3/1953 Luers (Continued)

FOREIGN PATENT DOCUMENTS

CN 201309018 9/2009
CN 201537708 8/2010

(Continued)

OTHER PUBLICATIONS

Machine translation of CN 201537708, printed Jul. 2015.*

(Continued)

*Primary Examiner* — Daniel Howell
(74) *Attorney, Agent, or Firm* — Downey Brand LLP

(57) ABSTRACT

A method for machining may include providing a workpiece with a major (e.g., top) surface and an edge at a perimeter thereof. The method may also include providing a machining tool including an outer rotary cutter and an inner rotary cutter. The workpiece may be machined in a single pass of the machining tool around the perimeter thereof. Machining the workpiece may include simultaneously machining the edge with the inner rotary cutter and machining at least a portion of the major surface with the outer rotary cutter. Accordingly, the edge and at least a portion of the major surface of the workpiece may be simultaneously machined in a single pass. The inner rotary cutter may also simultaneously machine an undercut at the edge of the workpiece. A related machining apparatus including the machining tool is provided. Further, a computer readable medium may include program code for performing the above-described operations.

19 Claims, 10 Drawing Sheets

(56) References Cited

U.S. PATENT DOCUMENTS

| | | | | |
|---|---|---|---|---|
| 3,635,124 A | * | 1/1972 | Parsons | 409/132 |
| 3,696,708 A | * | 10/1972 | Lopas | 409/132 |
| 3,774,279 A | * | 11/1973 | Hunter | 407/30 |
| 4,462,292 A | | 7/1984 | Pearl | |
| 4,614,463 A | * | 9/1986 | Hughes | 407/49 |
| 4,688,613 A | * | 8/1987 | Bassett | 144/136.1 |
| 4,733,997 A | * | 3/1988 | Ford et al. | 409/84 |
| 4,925,347 A | * | 5/1990 | Seki et al. | 409/132 |
| 5,040,442 A | | 8/1991 | Nasu | |
| 5,044,843 A | * | 9/1991 | Velepec | 409/126 |
| 5,122,040 A | * | 6/1992 | Fields | 418/55.2 |
| 5,607,267 A | | 3/1997 | Heredia et al. | |
| 7,278,806 B1 | * | 10/2007 | Clayton | 409/140 |
| 2005/0053441 A1 | | 3/2005 | Lowder et al. | |
| 2008/0159819 A1 | * | 7/2008 | Bui et al. | 407/42 |
| 2011/0296661 A1 | * | 12/2011 | Schweigert | 29/428 |
| 2014/0010609 A1 | | 1/2014 | Trzaskos et al. | |

FOREIGN PATENT DOCUMENTS

| | | | |
|---|---|---|---|
| CN | 201537709 | | 8/2010 |
| CN | 201677045 | | 12/2010 |
| CN | 203542292 | | 4/2014 |
| JP | 62297010 A | * | 12/1987 |
| JP | 02053509 A | * | 2/1990 |
| JP | 08215918 A | * | 8/1996 |
| JP | 10230406 A | * | 9/1998 |
| JP | 2002233908 A | * | 8/2002 |
| WO | 2007073384 A1 | | 6/2007 |

OTHER PUBLICATIONS

Chinese Application No. 201310279279.7 (Notification of the 1st Office Action and Search Report) dated Jun. 2, 2015.

* cited by examiner

`US 9,138,814 B2`

METHOD FOR MACHINING AND RELATED MACHINING TOOL, MACHINING APPARATUS, AND COMPUTER CODE

TECHNICAL FIELD

The present disclosure relates generally to machining workpieces, and more particularly to methods, machining tools, machining apparatuses, and computer code for machining a workpiece in a single pass.

BACKGROUND

Machining metal and other materials is known to be useable to produce a variety of products. For example, a workpiece may be machined to form a housing for a consumer electronic device such as a phone, tablet computer, or monitor. However, machining materials may take a relatively long period of time. For example, milling may typically involve directing a milling cutter about the periphery of a workpiece a number of times in order to machine the workpiece into a desired shape.

Further, repetitively directing a milling cutter about the periphery of a workpiece may introduce the possibility for increased imprecision in the machining processes. In this regard, to the extent the milling cutter deviates from the desired position as it moves about the periphery of the workpiece the resulting product may also deviate from the desired shape. Thus, since the milling cutter may move about the periphery of the workpiece numerous times, each pass may produce differing deviations from the desired shape of the end product.

The errors in the shape of the resulting product may be alleviated by sanding, polishing, or performing other finishing operations. However, in order to remove the imperfections in the end product, the finishing procedures may remove additional material that causes the end product to deviate further from the desired shape and size. For example, the thickness of the end product may be reduced by the finishing processes below a desired thickness. Further, finishing procedures may require additional time and expense that further increases the cost of the product. Accordingly, improved machining procedures may be desirable.

SUMMARY

A method for machining is provided. The method may include providing a workpiece with a major (e.g., top) surface and an edge at a perimeter thereof. The method may also include providing a machining tool including an outer rotary cutter and an inner rotary cutter. The workpiece may be machined in a single pass of the machining tool around the perimeter of the workpiece. Machining the workpiece may include simultaneously machining the edge with the inner rotary cutter and machining at least a portion of the major surface with the outer rotary cutter. Accordingly, the edge and at least a portion of the major surface of the workpiece may be simultaneously machined in a single pass. The inner rotary cutter may also simultaneously machine an undercut at the edge of the workpiece.

In one embodiment the method may additionally include lifting the machining tool relative to the workpiece and machining a remaining portion of the major surface with the inner rotary cutter. In another embodiment, the outer rotary cutter may machine the entire surface of the workpiece during the single pass. For example, the outer rotary cutter may extend to a distance equal to at least one half of the width of the workpiece, such that the major surface may be machined to a distance from the perimeter equal to at least half of the width at any given point as the machining tool completes the single pass.

The above-described operations may be embodied as computer code stored on a non-transitory computer readable medium, for execution by a processor in a machining apparatus. An example embodiment of a machining apparatus may include the above-described machining tool. The machining tool may include an extension to machine the undercut, and a bottom portion of the inner rotary cutter may be configured to machine the remaining portion of the major surface, in embodiments including that operation.

Further, the machining apparatus may include a motor, a controller, a machine table, an adjustment mechanism configured to adjust the position of the machining tool relative to the workpiece, and a fixture configured to hold the workpiece. The fixture may define a recessed portion configure to define a clearance with respect to the inner rotary cutter.

Other apparatuses, methods, computer code, features and advantages of the disclosure will be or will become apparent to one with skill in the art upon examination of the following figures and detailed description. It is intended that all such additional systems, methods, computer code, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed methods for machining, machining tool, machining apparatus, and computer readable medium. These drawings in no way limit any changes in form and detail that may be made to the disclosure by one skilled in the art without departing from the spirit and scope of the disclosure.

DETAILED DESCRIPTION

Exemplary applications of apparatuses, assemblies, systems, computer code, and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Figure 1:
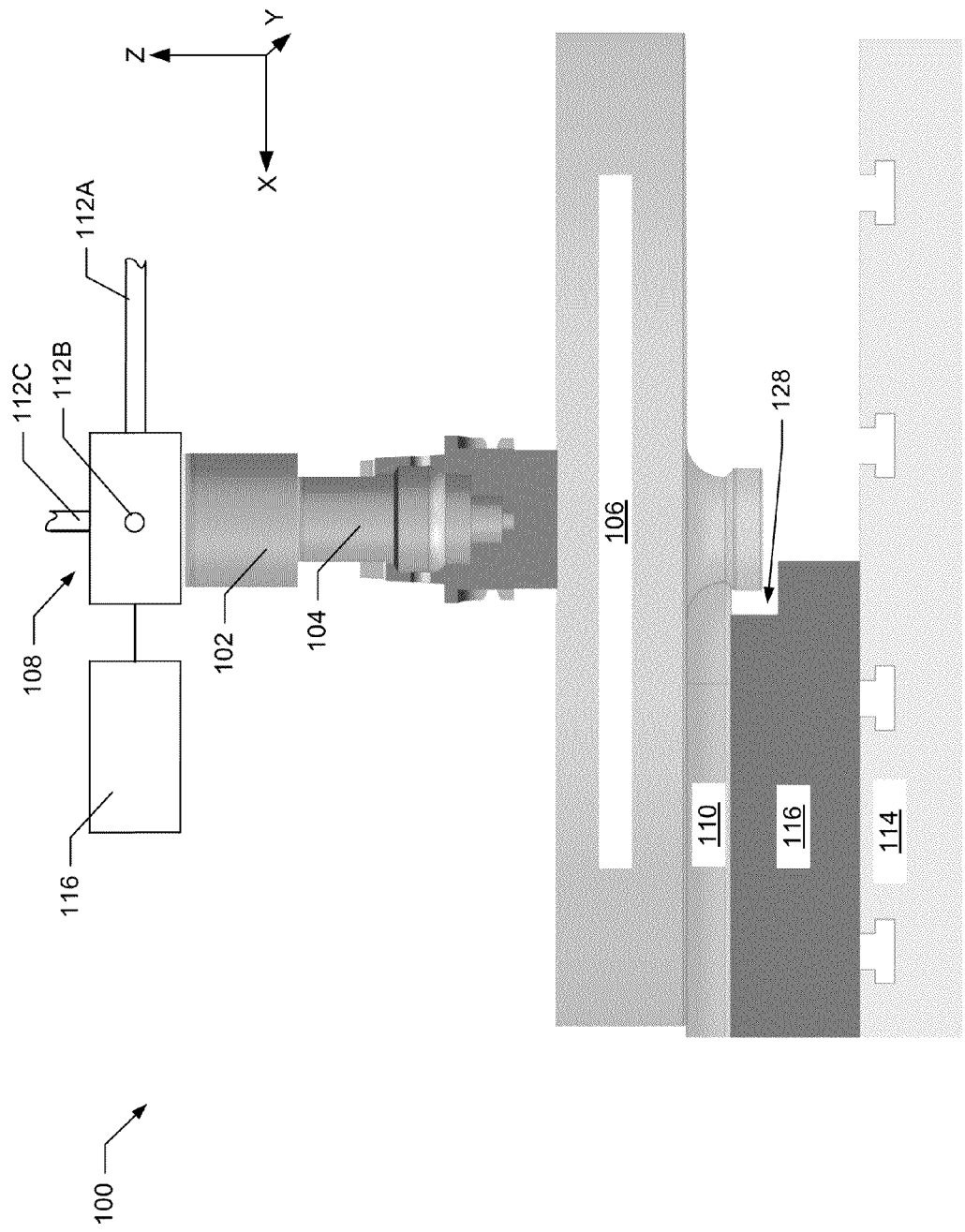
FIG. 1 illustrates a side schematic view of a machining apparatus including a machining tool according to an example embodiment of the present disclosure.

FIG. 1 schematically illustrates a portion of a machining apparatus 100 in accordance with an example embodiment of the present disclosure. The machining apparatus 100 may include a motor 102 coupled to a rotatable shaft 104. A machining tool 106 may be coupled to the rotatable shaft 104. The machining tool 106 is tool is illustrated as partially cutaway in order to show receipt of the shaft 104 therein. Example embodiments of the machining tool 106 that may be employed in the machining apparatus 100 are discussed in detail below.

The machining apparatus 100 may further comprise an adjustment mechanism 108 configured to adjust a position of the machining tool 106. In particular, the adjustment mechanism 108 may be configured to adjust the position of the machining tool 106 relative to a workpiece 110 which the machining apparatus 100 may machine, as explained below. In one embodiment the adjustment mechanism 108 may comprise one or more actuators 112A-C respectively configured to adjust the position of the machining tool 106 along X, Y, and Z axes. By way of example, the actuators 112A-C may comprise hydraulic actuators, although various other actuators may be employed in other embodiments.

In the illustrated embodiment the adjustment mechanism 108 is configured to adjust the position of the machining tool 106. However, in other embodiments the adjustment mechanism 108 may additionally or alternatively be configured to adjust the position of the workpiece 110. In this regard, the machining apparatus 100 may further comprise a machine table 114. A fixture 116 may be mounted to the machine table 114 and configured to hold the workpiece. Thus, by adjusting the position of the machine table 114, or the fixture 116 itself, the position of the machining tool 106 relative to the workpiece 110 may be adjusted. Accordingly, the position of the machining tool 106 relative to the workpiece 110 may be adjusted by adjusting the position of the machining tool and/or the workpiece.

The machining apparatus 100 may further comprise a controller 116. The controller 116 may be configured to execute computer code and employ computer numerical control (CNC) to machine the workpiece 110. In this regard, the controller 116 may be configured to execute computer code in order to control the relative position of the machining tool 106 with respect to the workpiece 110, the rotational speed of the motor 102 and the machining tool 106, and or various other parameters associated with performing machining operations.

As noted, above, the machining apparatus 100 may employ various embodiments of machining tools 106 to machine the workpiece 110. Note that the various embodiments of machining tools 106 illustrated herewith show the cutting envelope of the machining tools. In this regard, the machining tools 106 may extend to the overall shape illustrated while rotating during use.

Figure 2:
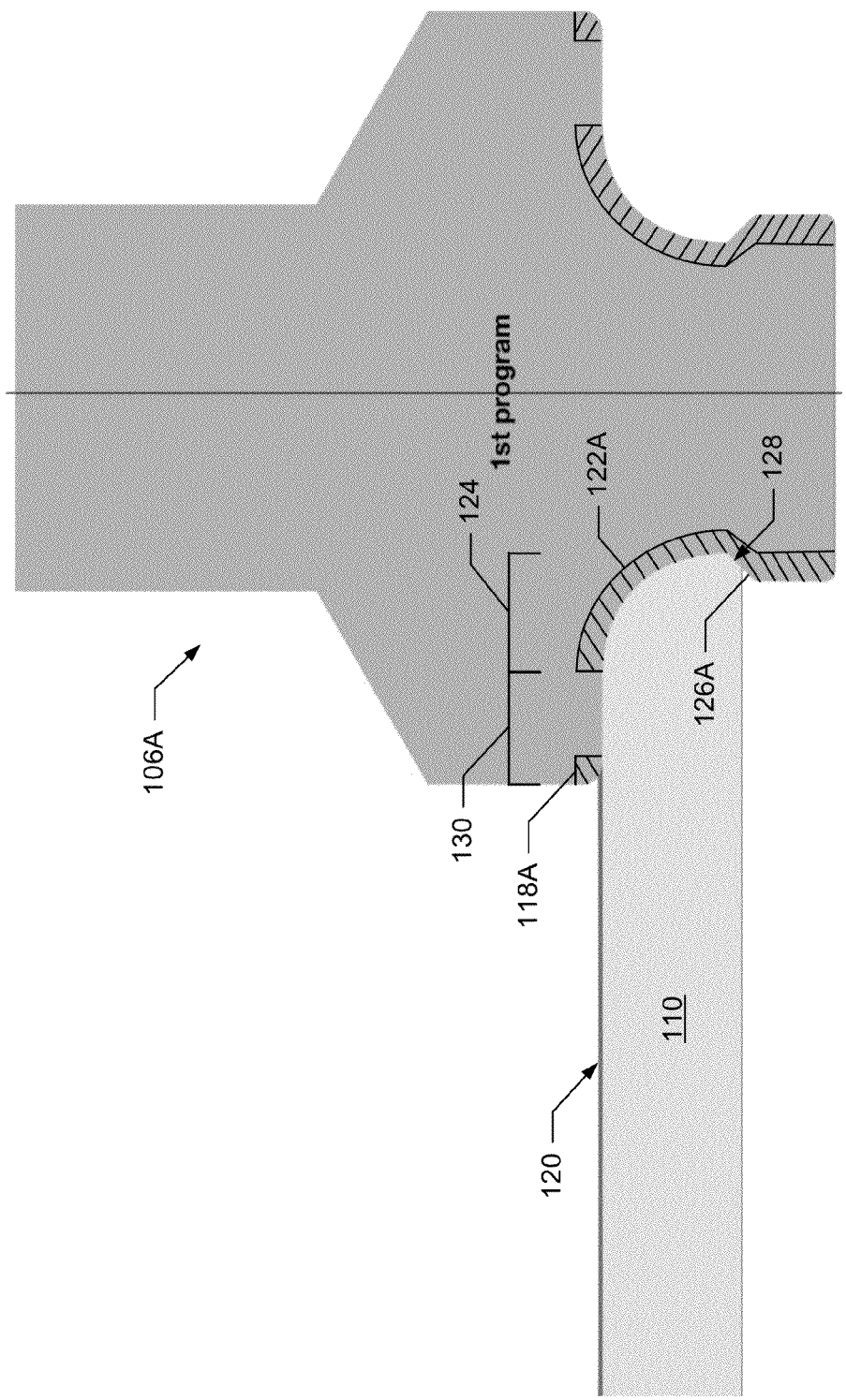
FIG. 2 illustrates a cutting envelope of a machining tool while machining an edge and a portion of a major surface of a workpiece according to a first example embodiment of the disclosure.

FIG. 2 illustrates a first example embodiment of a machining tool 106A. As illustrated, the machining tool 106A may comprise an outer rotary cutter 118A, which may be configured to machine at least a portion of a major surface 120 (e.g., a top surface) of the workpiece 110. Further, the machining tool 106A may comprise an inner rotary cutter 122A configured to machine an edge 124 of the workpiece 110.

The outer rotary cutter 118A and the inner rotary cutter 122A may comprise cutting tips, blades, inserts, and/or other features configured to cut the workpiece 110. In one embodiment the outer rotary cutter 118A and/or the inner rotary cutter 122A may comprise a relatively strong material such as metal crystal diamond, high speed steel, titanium, cobalt steel, carbide, and/or ceramic, with or without a coating such as titanium nitride. However, the outer rotary cutter 118A and the inner rotary cutter 122A may comprise various other materials depending on the material of the workpiece 110 that is to be cut. In one example embodiment the workpiece 110 may comprise a metal such as aluminum. However, the machining tool 106 may be configured to machine other materials in other embodiments.

The outer rotary cutter 118A and the inner rotary cutter 122A may be configured to simultaneously machine the major surface 120 and the edge 124 of the workpiece 110. In particular, as noted above, the inner rotary cutter 122A may machine the edge 124. As illustrated, in some embodiments the inner rotary cutter 122A may define an extension 126A configured to machine an undercut 128 at the edge 124 of the workpiece 110. However, the inner rotary cutter 122A may be configured to not define the undercut 128 in other embodiments, depending on the desired shape of the end product.

Returning to FIG. 1, the fixture 116 may comprise a recessed portion 128 configured to define a clearance with respect to an inner rotary cutter of the machining tool 106 (e.g., inner rotary cutter 122A). In this regard, as noted above, the inner rotary cutter (e.g., inner rotary cutter 122A) of the machining tool 106 may include an extension (e.g., extension 126A). Accordingly, the recessed portion 128 may allow the machining tool 106 to extend partially underneath the workpiece 110 while avoiding contact with the fixture 116.

As noted, the inner rotary cutter 122A may machine the edge 124 of the workpiece 110. Simultaneously, the outer rotary cutter 118A machine the major surface 120 of the workpiece 110. In particular, as illustrated in FIG. 2, the outer rotary cutter 118A may machine a portion 130 of the major surface 120.

Figure 3:
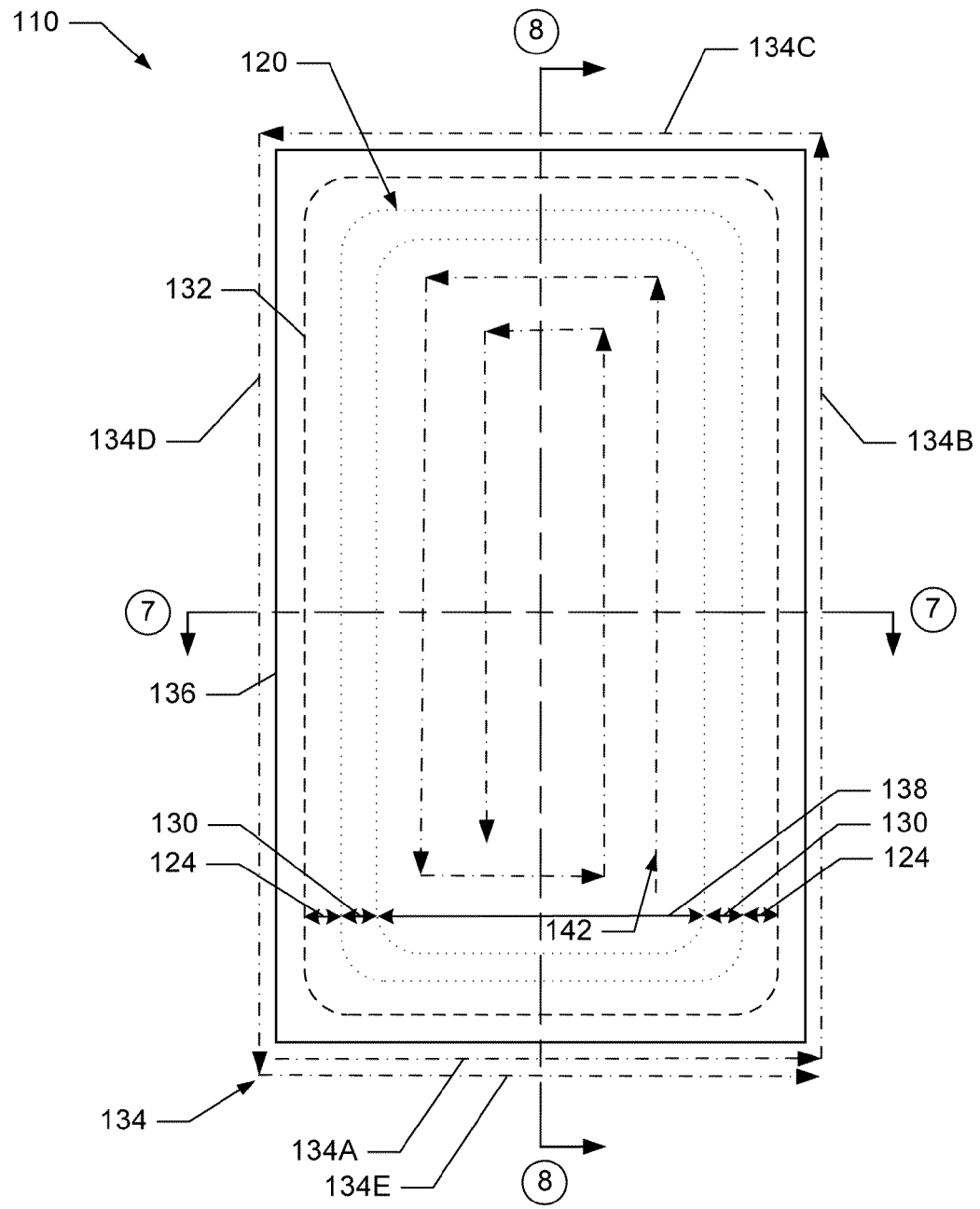
FIG. 3 illustrates first and second machining paths of the machining tool of FIG. 2 with respect to a workpiece according to the first example embodiment of the disclosure.

The outer rotary cutter 118A and the inner rotary cutter 122A may be configured to simultaneously machine the portion 130 of the major surface 120 of the workpiece 110 and the edge 124 of the workpiece in a single pass around a perimeter of the workpiece. In this regard, FIG. 3 illustrates an overhead view of the workpiece 110 including an outline of an example end product 132 resulting from machining the workpiece with the machining apparatus 100. The machining tool 106A may move relative to the workpiece 110 (i.e. the machining tool and/or the workpiece may move) along a single pass illustrated by path 134 about a perimeter 136 of the workpiece. Although each portion 134A-E of the path 134 is schematically illustrated as a discrete straight movement, the path may be configured to define the desired shape of the end product 132.

As the machining tool 106A completes a single pass along the path 134 about the perimeter 136 of the workpiece, portions 134A,E of the path defined by the single pass may overlap. In this regard, a single pass, as used herein, refers to a path about the perimeter of a workpiece that involves less than two complete passes about the perimeter of the workpiece. For example, as illustrated, the overlapping portions 134A,E of the path 134 of the single pass about the perimeter 136 of the workpiece may allow the machining tool 106A to return to an initial starting position and continue past this starting position, if desired, in order to ensure that an even finish is achieved at the starting point.

Figure 4:
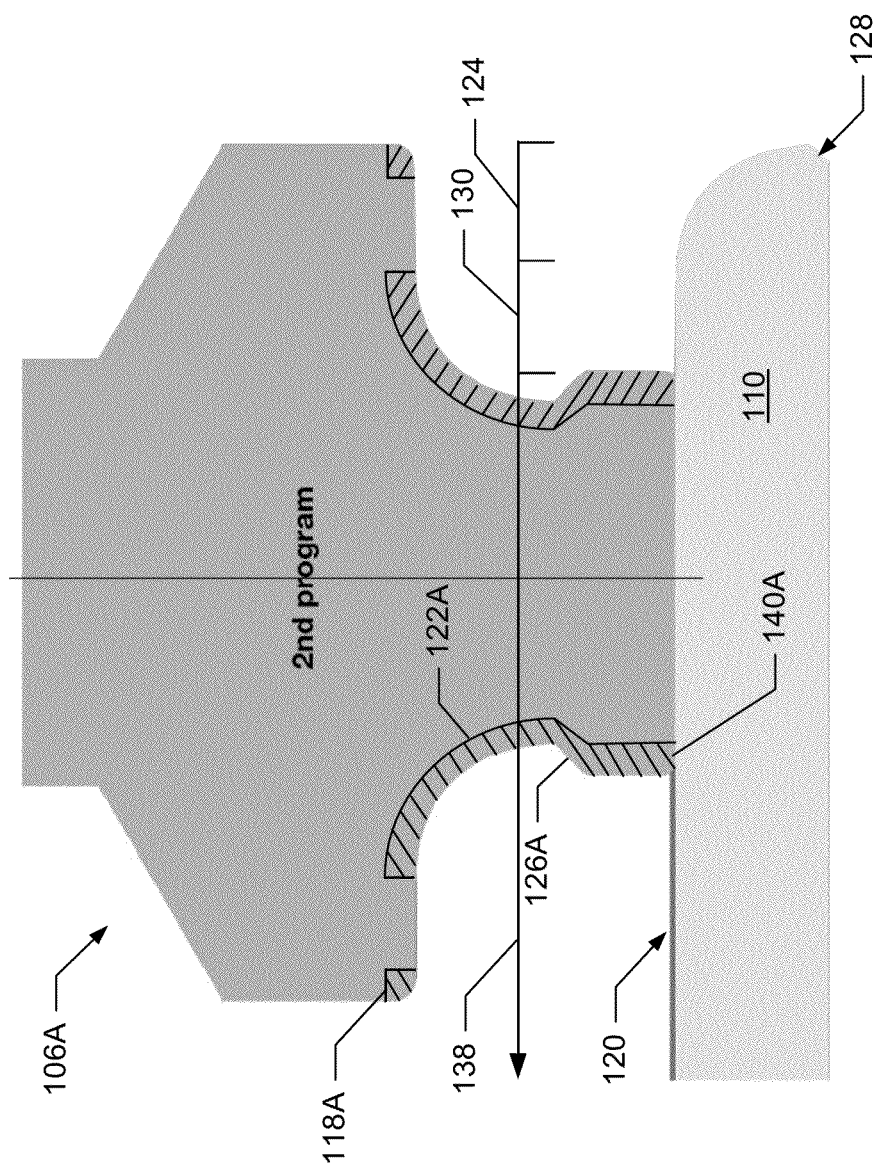
FIG. 4 illustrates the cutting envelope of the machining tool of FIG. 2 while machining a remaining portion of the major surface according to the first example embodiment of the disclosure.

After the machining tool 106A completes a single pass along the path 134 around the perimeter 136 of the workpiece, the edge 124 and the portion 130 of the major surface 120 of the workpiece 110 may be machined into a desired shape. However, a remaining portion 138 of the major surface 120 of the workpiece 110 may still need to be machined. Accordingly, as illustrated in FIG. 4, the machining tool 106A may be lifted relative to the workpiece 110, and the inner rotary cutter 122A may machine the remaining portion 138 of the workpiece. In particular, a bottom portion 140A of the inner rotary cutter 122A may be employed to machine the remaining portion 138 of the workpiece 110.

In this regard, as illustrated in FIG. 3, the machining tool 106A may be moved relative to the workpiece 110 along a second path 142 in order to machine the remaining portion 138 of the workpiece. Note that the second path 142 is illustrated by way of example, and various other paths may be employed to machine the remaining portion 138 of the workpiece 110. By moving the machining tool 106A relative to the workpiece 110 along the paths 134, 142, the entirety of the major surface 120 and the edge 124 of the workpiece may be machined. In this regard, the edge 124 and the portion 130 of the major surface 120 of the workpiece 110 may be machined in an expedited manner through a single pass of the machining tool 106A, and then the remaining portion 138 of the major surface may be machined.

Figure 5:
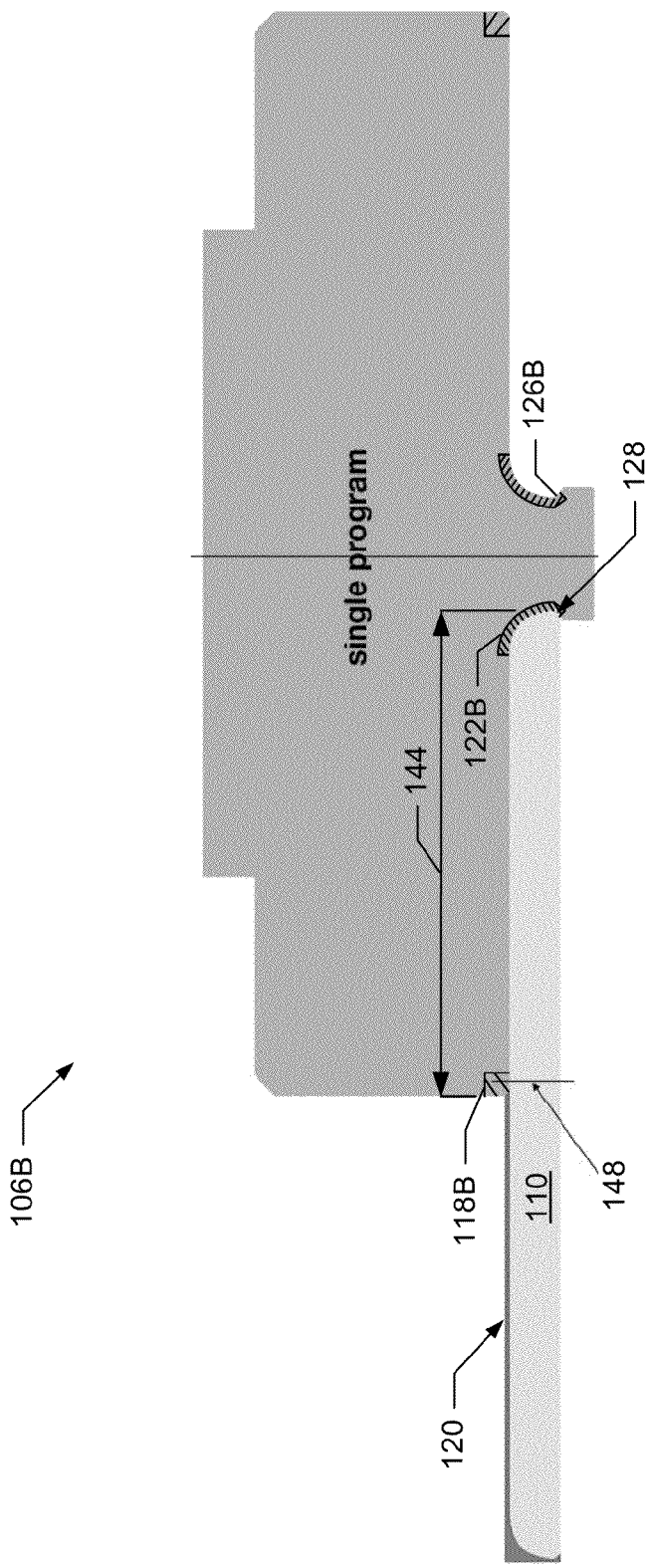
FIG. 5 illustrates a cutting envelope of a machining tool while machining an edge and a major surface of a workpiece according to a second example embodiment of the disclosure.

FIG. 5 illustrates a second embodiment of a machining tool 106B. The machining tool 106B may be substantially similar to the embodiment of the machining tool 106A described above. Accordingly, for example, the machining tool 106B may comprise an outer rotary cutter 118B and an inner rotary cutter 122B including an extension 126B. However, as illustrated, the machining tool 106B may differ in that the outer rotary cutter 118B may be configured to extend from the perimeter 136 of the workpiece (when the inner rotary cutter 120B is in contact therewith) to a distance 144 equal to at least one half of a width 146 (see, e.g., FIG. 6) of the workpiece 110. The width, as used herein, refers to the shortest distance across the major surface 120 of the workpiece. In this regard, as illustrated in FIG. 5, the outer rotary cutter 118B extends to, or past, a midpoint 148 of the workpiece. Accordingly, the machining tool 106B may be configured to machine at least half of the width 146 of the major surface 120 of the workpiece 110 when in contact with the perimeter 136 thereof.

Figure 6:
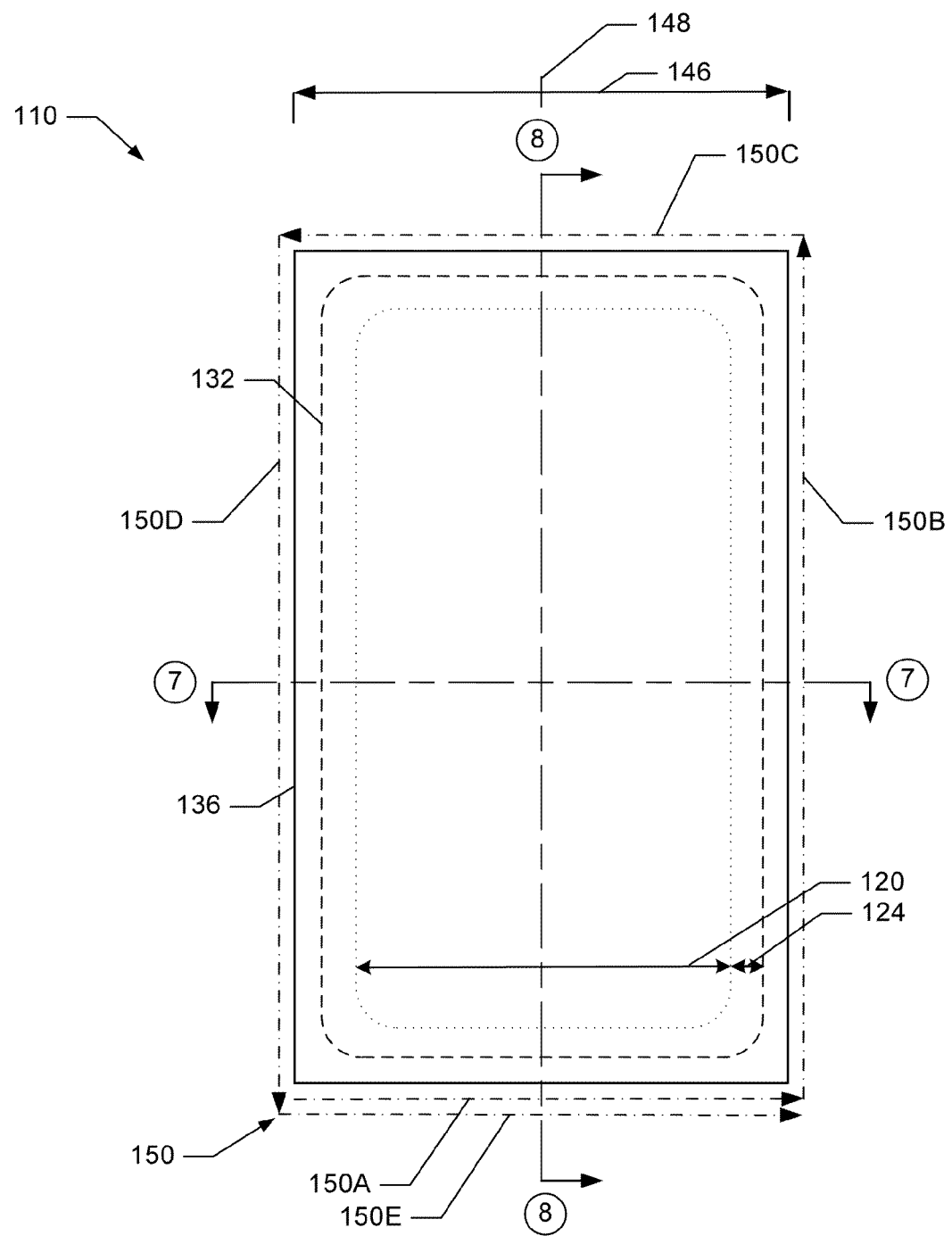
FIG. 6 illustrates a machining path of the machining tool of FIG. 5 with respect to a workpiece according to the second example embodiment of the disclosure.

Thus, as illustrated in FIG. 6, which is an overhead view of the workpiece 110 including an outline of the example end product 132 resulting from machining the workpiece with the machining apparatus 100. The machining tool 106B may move relative to the workpiece 110 (i.e. the machining tool and/or the workpiece may move) along a single pass illustrated by path 150 about a perimeter 136 of the workpiece. Although each portion 150A-E of the path 150 is schematically illustrated as a discrete straight movement, the path may be configured to define the desired shape of the end product 132.

As the machining tool 106B completes a single pass along the path 150 about the perimeter 136 of the workpiece, portions 150A,E of the path may overlap. In this regard, as noted above, a single pass refers to a path about the perimeter of the workpiece that involves less than two complete passes about the perimeter of the workpiece. For example, as illustrated, the overlapping portions 150A,E of the path 150 of the single pass about the perimeter 136 of the workpiece may allow the machining tool 106B to return to an initial starting position and continue past this starting position, if desired, in order to ensure that an even finish is achieved at the starting point.

After the machining tool 106B completes a single pass along the path 150 around the perimeter 136 of the workpiece, the edge 124 and the entirety of the major surface 120 of the workpiece 110 may be machined into a desired shape. In this regard, since the outer rotary cutter 118B extends to at least one half of the width 146 of the workpiece 110 (i.e. at least to the midpoint 148 of the workpiece), the entirety of the major surface 120 may be machined as the machining tool completes the pass around the perimeter 136. Accordingly, the workpiece 110 may be machined into the end product 132 in a single pass, which may expedite the production of the end product.

Figure 7:
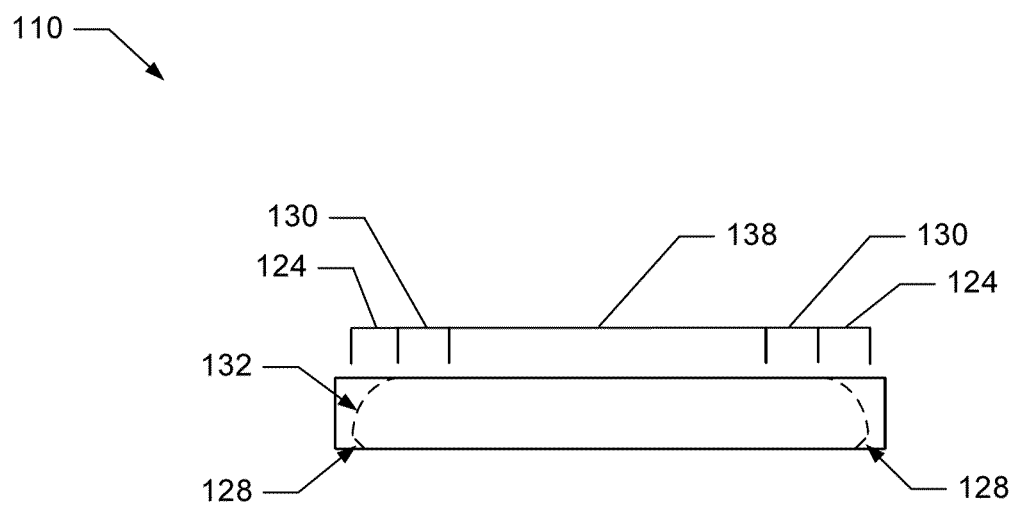
FIG. 7 illustrates a cross-sectional view through the workpiece illustrated in FIGS. 3 and 6 along lines 7-7 according to an example embodiment of the present disclosure.
Figure 8:
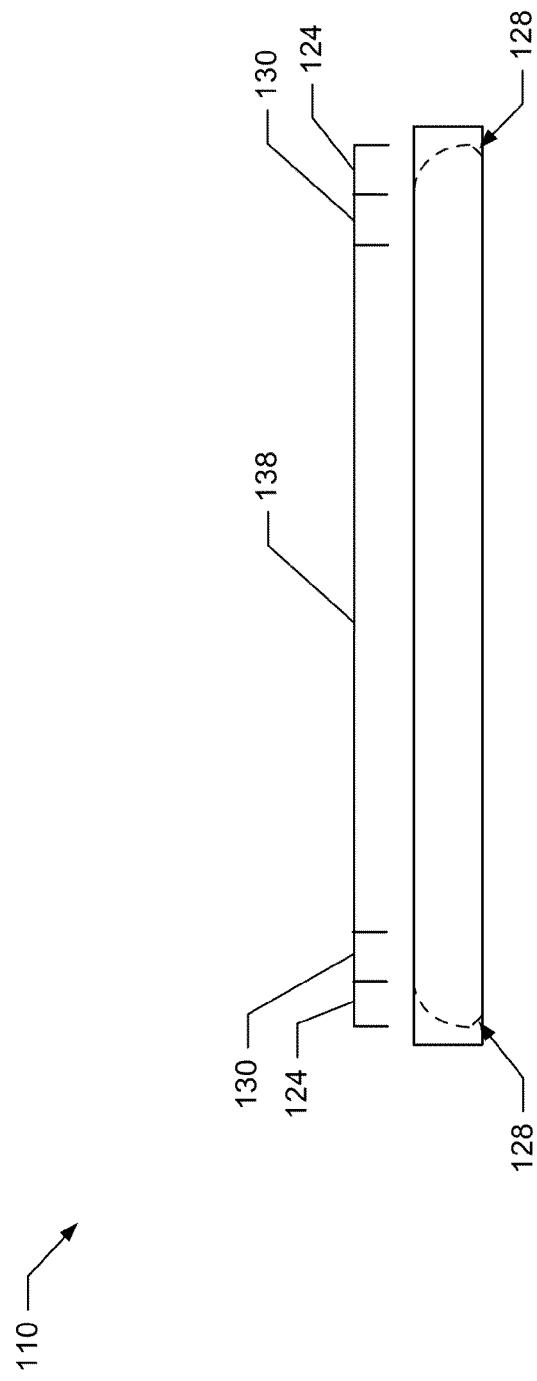
FIG. 8 illustrates a cross-sectional view through the workpiece illustrated in FIGS. 3 and 6 along lines 8-8 according to an example embodiment of the present disclosure.

FIG. 7 and FIG. 8 illustrate cross-sectional views through the workpiece 110 including an outline of the example end product 132 along lines 6-6 and 7-7 in FIGS. 3 and 6. As illustrated, the end product 132 defines a constant cross-sectional profile at the edge 124. In this regard, the methods, apparatuses, and computer code described herein may be configured to produce various embodiments of end products defining an edge with a constant cross-sectional profile.

Figure 9:
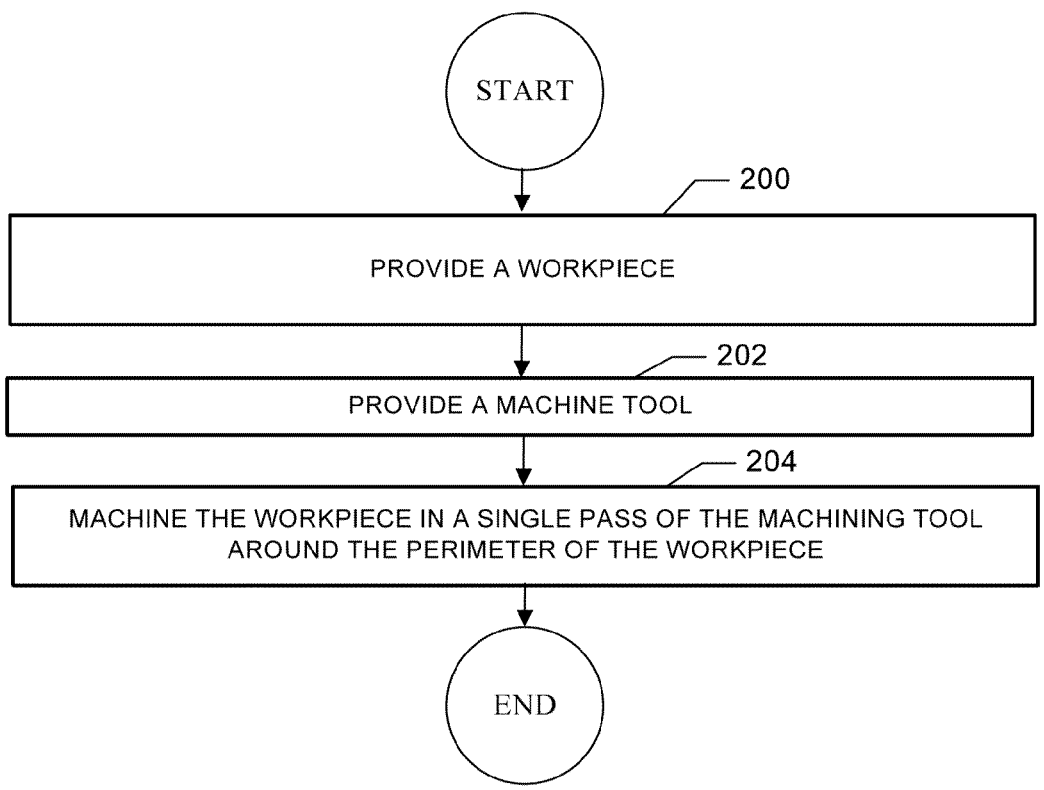
FIG. 9 illustrates a method for machining according to an example embodiment of the present disclosure.

A related method for machining is also provided. As illustrated in FIG. 9, the method may include providing a workpiece at operation 200. The workpiece may define a major surface and one or more edges at a perimeter of the workpiece. The method may further comprise providing a machining tool at operation 202. The machining tool may comprise an outer rotary cutter and an inner rotary cutter. Further, the method may include machining the workpiece in a single pass of the machining tool around the perimeter of the workpiece at operation 204. Machining the workpiece in the single pass at operation 204 may comprise simultaneously machining the edge of the workpiece with the inner rotary cutter of the machining tool and machining at least a portion of the major surface of the workpiece with the outer rotary cutter of the machining tool.

Machining the workpiece in the single pass at operation 204 may further comprise simultaneously machining an undercut at the edge of the workpiece with the inner rotary cutter. The method may also include lifting the machining tool relative to the workpiece and machining a remaining portion of the major surface of the workpiece with the inner rotary cutter. However, in an alternate embodiment machining at least the portion of the major surface of the workpiece with the outer rotary cutter of the machining tool may comprise machining an entirety of the major surface of the workpiece. Further, machining the entirety of the major surface of the workpiece may comprise machining the major surface to a distance from the perimeter equal to at least one half of a width of the workpiece.

Figure 10:
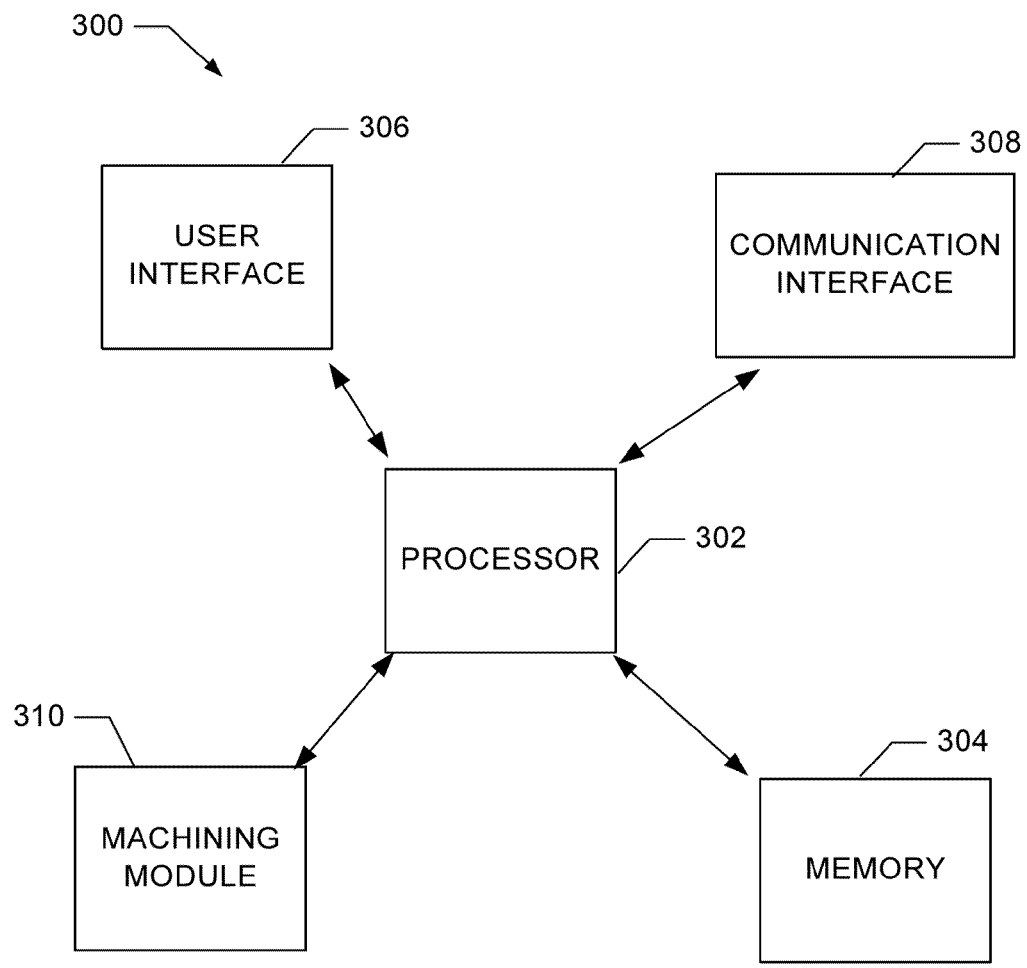
FIG. 10 illustrates a block diagram of an electronic device according to an example embodiment of the present disclosure.

FIG. 10 is a block diagram of an electronic device 300 suitable for use with the described embodiments. In one example embodiment the electronic device 300 may be embodied in or as the controller 116 for the machining apparatus 100. In this regard, the electronic device 300 may be configured to control or execute the above-described operations including controlling the position of the machining tool 106.

The electronic device 300 illustrates circuitry of a representative computing device. The electronic device 300 includes a processor 302 that may be microprocessor or controller for controlling the overall operation of the electronic device 300. In one embodiment the processor 302 may be particularly configured to perform the functions described herein. The electronic device 300 also includes a memory device 304. The memory device 304 may include non-transitory and tangible memory that may be, for example, volatile and/or non-volatile memory. The memory device 304 may be configured to store information, data, files, applications, instructions or the like. For example, the memory device 304 could be configured to buffer input data for processing by the processor 302. Additionally or alternatively, the memory device 304 could be configured to store instructions for execution by the processor 302.

The electronic device 300 may also include a user interface 306 that allows a user of the electronic device 300 to interact with the electronic device. For example, the user interface 306 can take a variety of forms, such as a button, keypad, dial, touch screen, audio input interface, visual/image capture input interface, input in the form of sensor data, etc. Still further, the user interface may be configured to output information to the user through a display, speaker, or other output device. A communication interface 308 may provide for transmitting and receiving data through, for example, a wired or wireless network such as a local area network (LAN), a metropolitan area network (MAN), and/or a wide area network (WAN), for example, the Internet.

The electronic device 300 may also include a machining module 310. The processor 302 may be embodied as, include or otherwise control the machining module 310. The machining module 310 may be configured for controlling a position of a machining tool and various other related parameters associated with employing the machining tool to machine a workpiece.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling machining operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above-described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A method for machining, comprising:
   positioning a workpiece having a major surface and one or more edges at a perimeter of the workpiece;
   machining the workpiece in a single pass of a machining tool around the perimeter of the workpiece, the machining tool including an outer rotary cutter and an inner rotary cutter, wherein machining the workpiece comprises simultaneously:
   machining the edge of the workpiece with the inner rotary cutter of the machining tool, and
   machining at least a portion of the major surface of the workpiece with the outer rotary cutter of the machining tool; and
   lifting the machining tool relative to the workpiece and machining a remaining portion of the major surface of the workpiece with the inner rotary cutter.

2. The method of claim 1, wherein machining the workpiece in the single pass further comprises simultaneously machining an undercut at the edge of the workpiece with the inner rotary cutter.

3. The method of claim 1, wherein machining at least the portion of the major surface of the workpiece with the outer rotary cutter of the machining tool comprises machining an entirety of the major surface of the workpiece.

4. The method of claim 3, wherein machining the entirety of the major surface of the workpiece comprises machining the major surface to a distance from the perimeter equal to at least one half of a width of the workpiece.

5. A machining tool assembly, comprising
   a machining tool comprising:
   an outer rotary cutter configured to machine at least a portion of a major surface of a workpiece, and
   an inner rotary cutter configured to machine an edge of the workpiece, wherein the outer rotary cutter and the inner rotary cutter are configured to simultaneously machine the portion of the major surface of the workpiece and the edge of the workpiece in a single pass around a perimeter of the workpiece; and
   an adjustment mechanism that adjusts a position of the machining tool relative to the workpiece, the adjustment mechanism lifts the machining tool relative to the workpiece and machine a remaining portion of the major surface of the workpiece with the inner rotary cutter.

6. The machining tool assembly of claim 5, wherein the inner rotary cutter defines an extension configured to machine an undercut at the edge of the workpiece.

7. The machining tool assembly of claim 5, wherein a bottom portion of the inner rotary cutter is configured to machine the remaining portion of the major surface of the workpiece.

8. The machining tool assembly of claim 5, wherein the outer rotary cutter is configured to extend from the inner rotary cutter to a distance equal to at least one half of a width of the workpiece.

9. A machining apparatus, comprising:
   a motor coupled to a rotatable shaft;
   a machining tool coupled to the rotatable shaft, the machining tool comprising:
   an outer rotary cutter configured to machine at least a portion of a major surface of a workpiece, and
   an inner rotary cutter configured to machine an edge of the workpiece, wherein the outer rotary cutter and the inner rotary cutter are configured to simultaneously machine the major surface of the workpiece and the edge of the workpiece in a single pass around a perimeter of the workpiece; and
   an adjustment mechanism configured to adjust a position of the machining tool relative to the workpiece, the adjustment mechanism lifting the machining tool relative to the workpiece and machine a remaining portion of the major surface of the workpiece with the inner rotary cutter.

10. The machining apparatus of claim 9, wherein the inner rotary cutter defines an extension configured to machine an undercut at the edge of the workpiece.

11. The machining apparatus of claim 9, wherein a bottom portion of the inner rotary cutter is configured to machine a remaining portion of the major surface of the workpiece.

12. The machining apparatus of claim 9, wherein the outer rotary cutter is configured to extend from the inner rotary cutter to a distance equal to at least one half of a width of the workpiece.

13. The machining apparatus of claim 9, further comprising a fixture configured to hold the workpiece.

14. The machining apparatus of claim 13, wherein the fixture comprises a recessed portion configured to define a clearance with respect to the inner rotary cutter.

15. A non-transitory computer readable medium for storing computer instructions executed by a processor in a machining apparatus for controlling a position of a machining tool relative to a workpiece, the workpiece having a major surface and one or more edges at a perimeter of the workpiece, the non-transitory computer readable medium configured to cause the machining apparatus to carry out steps including:

machining the workpiece in a single pass of the machining tool around the perimeter of the workpiece, the machining tool including an outer rotary cutter and an inner rotary cutter, wherein machining the workpiece in the single pass comprises simultaneously:

machining the edge of the workpiece with the inner rotary cutter of the machining tool, and machining at least a portion of the major surface of the workpiece with the outer rotary cutter of the machining tool; and lifting the machining tool relative to the workpiece and machining a remaining portion of the major surface of the workpiece with the inner rotary cutter.

16. The non-transitory computer readable medium of claim 15, wherein machining the workpiece in the single pass further comprises simultaneously machining an undercut at the edge of the workpiece with the inner rotary cutter.

17. The non-transitory computer readable medium of claim 15, wherein a bottom portion of the inner rotary cutter is configured to machine the remaining portion of the major surface of the workpiece.

18. The non-transitory computer readable medium of claim 15, wherein machining at least the portion of the major surface of the workpiece with the outer rotary cutter of the machining tool comprises machining an entirety of the major surface of the workpiece.

19. The non-transitory computer readable medium of claim 18, wherein machining the entirety of the major surface of the workpiece comprises machining the major surface to a distance from the perimeter equal to at least one half of a width of the workpiece.

\* \* \* \* \*